Oct. 30, 1951        J. H. BRODIE        2,573,179
LIQUID MANURE SPREADER
Filed Jan. 19, 1951        2 SHEETS—SHEET 1
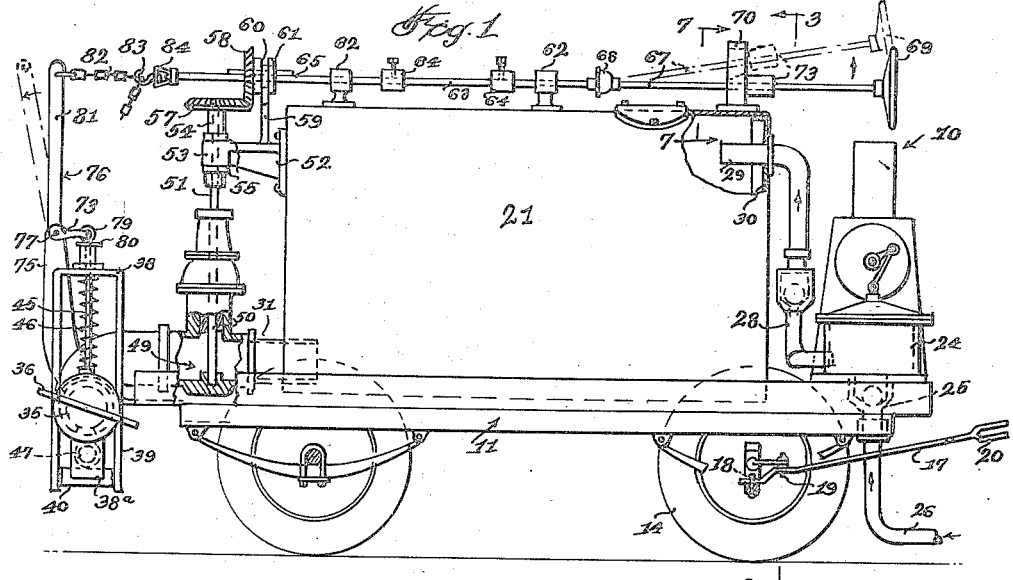
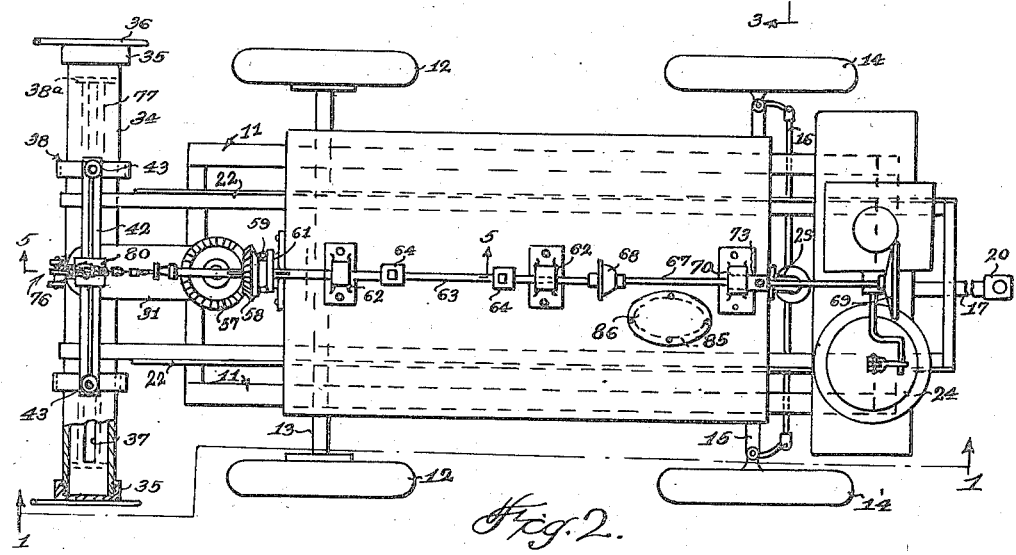
Inventor
JAMES H. BRODIE
By John N. Randolph
Attorney Oct. 30, 1951  J. H. BRODIE  2,573,179
LIQUID MANURE SPREADER
Filed Jan. 19, 1951  2 SHEETS—SHEET 2
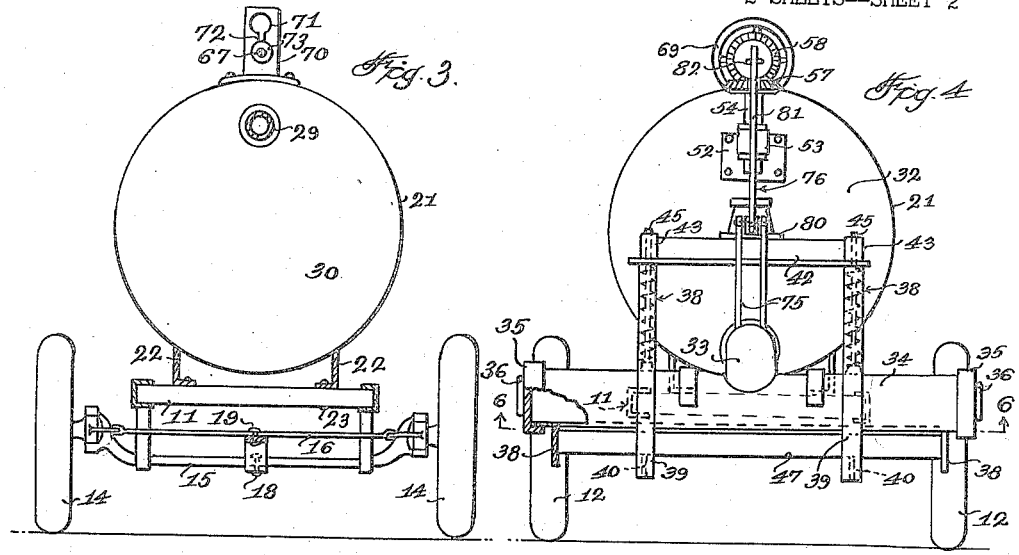
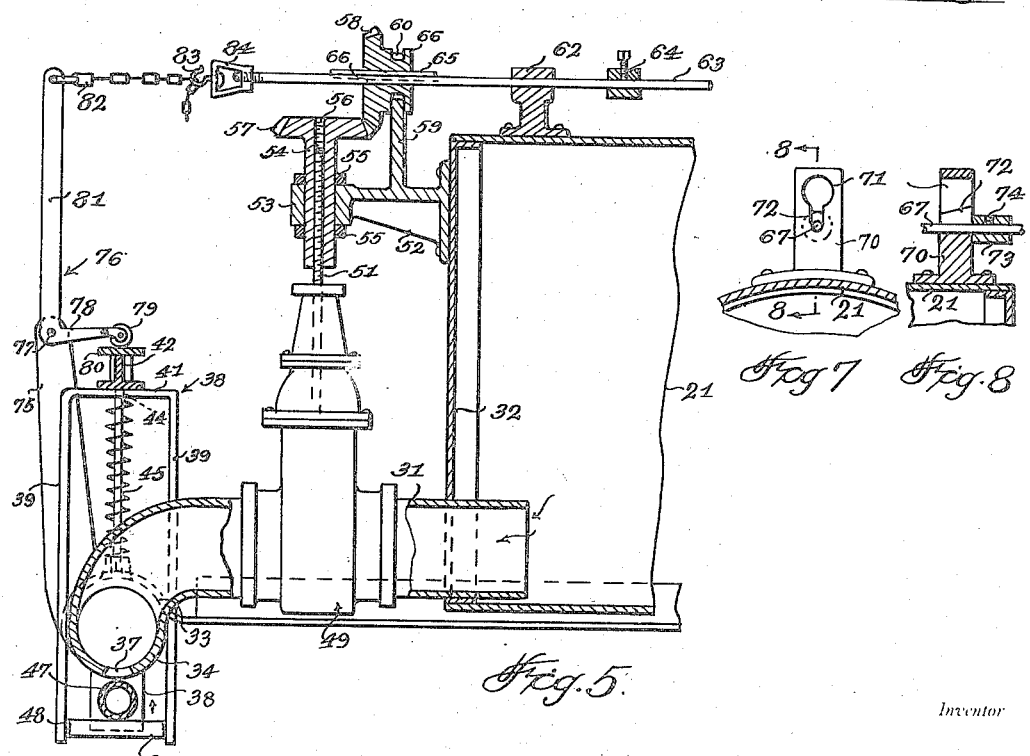
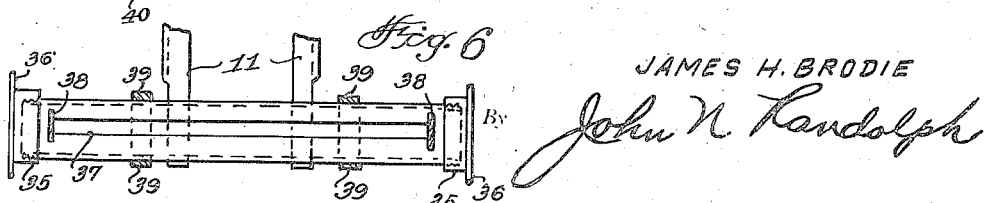
Inventor
JAMES H. BRODIE
By John N. Randolph
Attorney Patented Oct. 30, 1951

2,573,179

UNITED STATES PATENT OFFICE 2,573,179

LIQUID MANURE SPREADER

James H. Brodie, Henderson, N. C.

Application January 19, 1951, Serial No. 206,830

9 Claims. (Cl. 299—29)

This invention relates to a portable machine, preferably of the trailer type adapted to be drawn by any suitable draft vehicle such as a tractor, for dispensing and spreading liquid manure.

A primary object of the present invention is to provide a machine which is capable of efficiently dispensing and spreading liquid manure as it is received from barns and stables, such as dairy barns including relatively large particles of manure in solid or semi-solid form which may be efficiently dispensed and spread by the machine without danger of clogging the machine or its control valve.

More particularly, it is an aim of the present invention to provide a spreader for rough liquid manure which will effectively prevent the clogging of the machine by manure particles and wherein any choked or clogged condition can be readily eliminated by operation of a movable valve element, so that the roughest liquid manure may be spread upon and used to fertilize the soil without requiring any screening or other processing, thus enabling particles of fibre passing through animals which produce a perfect manure mulch when sprayed upon the land to be dispensed from the machine.

Modern farming procedure involves the cleaning of barns and stables with high pressure water hoses and the water and manure is washed from the barns or stables into large vats. Such liquid manure provides an extremely rich fertilizer particularly in its unprocessed state as received from the barn or stable. Accordingly, it is a primary object of the present invention to provide a machine capable of utilizing this liquid manure, normally discharged as waste into creeks, for fertilizing the land and by means of which machine the unprocessed liquid manure may be rapidly sprayed or broadcast by gravity onto the land.

Another and important object of the invention is to provide a machine of extremely simple construction capable of being economically manufactured and sold, which will be extremely efficient and durable for accomplishing its intended purpose and which is so constructed that the machine may be operated by the driver of a tractor or other draft vehicle to which the machine is connected for very rapidly fertilizing a relatively large area of ground.

Various other objects and advantages of the invention will hereinafter become more fully apparent from the following description of the drawings, illustrating a presently preferred embodiment thereof, and wherein:

Figure 1 is a side elevational view, partly in vertical section of the machine taken substantially along a plane as indicated by the line 1—1 of Figure 2;

Figure 2 is a top plan view of the machine, partly in horizontal section;

Figure 3 is an end elevational view, partly in cross section thereof taken substantially along a plane as indicated by the line 3—3 of Figure 1;

Figure 4 is an end elevational view looking toward the opposite, rear end of the machine or from left to right of Figures 1 and 2 and showing certain of the parts in vertical section;

Figure 5 is an enlarged fragmentary longitudinal vertical sectional view, partly in side elevation taken substantially along a plane as indicated by the line 5—5 of Figure 2;

Figure 6 is a horizontal sectional view taken substantially along a plane as indicated by the line 6—6 of Figure 4;

Figure 7 is a fragmentary vertical sectional view taken substantially along a plane as indicated by the line 7—7 of Figure 1 and on an enlarged scale, and Figure 8 is a longitudinal vertical sectional view taken substantially along a plane as indicated by the line 8—8 of Figure 7.

Referring more specifically to the drawings, the liquid manure spreader in its entirety is designated generally 10 and includes a mobile supporting frame composed of a frame or chassis 11 having a pair of rear wheels 12 journaled on a rear axle 13 and a pair of front steering wheels 14 journaled on a front axle 15 and which are connected by a conventional steering link connection 16 between the front wheels 14 for causing said front wheels to swing in unison on the ends of the axle 15. A draft tongue 17 is pivoted to the front axle 15 and steering link connection 16, as seen at 18 and 19, respectively (Figure 1), for causing the front wheels 14 to be steered so as to follow a draft vehicle, not shown, to which the forward end 20 of the tongue 17 is coupled in a conventional manner.

A large tank 21 is disposed on the frame 11, longitudinally thereof, and is secured thereto by suitable bracket members 22 which are attached by fastenings 23 to cross members of the frame 11, as best seen in Figure 3. A small pump 24 of any suitable type is secured to the forward end of the frame 11, forwardly of the tank 21 and has an inlet 25 to which the discharge end of a hose or flexible conduit 26 is detachably connected by a coupling 27. The pump 24 is provided with an upwardly extending outlet conduit 28 having an angularly disposed rearwardly extending discharge end 29 which projects through the front wall 30 of the tank 21, adjacent the top of said tank.

A relatively large outlet conduit 31 has one end thereof extending through the rear wall 32 of the tank 21 and which opens into said tank adjacent its bottom, as best seen in Figure 5. The outlet conduit 31 is supported rearwardly of the tank 21 by the rear portion of the frame 11 and has a downturned outlet end 33 which is disposed just beyond the rear ends of the longitudinal beams 10 of the frame 11 and which is suitably secured to or formed integral with an elongated valve housing 34. As seen in Figure 5, the discharge end 33 of the conduit 31 opens into the valve housing 34 and is disposed intermediate of the ends thereof, as seen in Figure 2. The valve housing 34 is rigidly supported by the rear end of the frame 11 transversely of the machine 10 and is of a length substantially equal to the gauge of the machine wheels. Housing 34 is preferably formed from a relatively large pipe the internal diameter of which is substantially equal to the diameter of the conduit 31. Valve housing 34 is provided with externally threaded ends for threadedly receiving closure caps 35 each of which is preferably provided with a handle 36 to facilitate applying and removing the caps 35. The bottom portion of the valve housing 34 is provided with an elongated relatively wide slot 37 which extends to adjacent the ends thereof. A pair of guide plates 38a is secured to the underside of the valve housing 34 and depend therefrom. The plates 38a are located just beyond both ends of the slot 37.

A pair of elongated yoke members 38 are disposed for vertical sliding movement relatively to the valve housing 34 each including a pair of substantially parallel legs 39 which straddle the housing 34 and which are connected at their lower ends by a cross bar 40 below the valve housing 34. The upper ends of the legs 39 of each yoke 38 are integrally connected by an upper cross bar 41. The upper cross bars 41 of the yokes 38 are rigidly connected in spaced substantially parallel relationship by a connecting bar 42. The connecting bar 42 is provided with upright sleeve portions 43 at the ends thereof, as seen in Figure 2, which align with openings 44 of the cross bars 41 to slidably receive the upper portions of guide rods 45 which are fixed to and rise from the upper surface of the valve housing 34 for guiding the yokes 38 in their vertical reciprocating movement. An expansion coil spring 46 is mounted on each rod 45. Each spring 46 has a lower end bearing against the housing 34 and an upper end bearing against a yoke portion 41 for urging the connected yokes 38 upwardly relatively to the housing 34. An elongated valve member 47 of circular cross section is supported near its two ends on the bottom cross bars 40 and is rigidly secured thereto by welds or the like as seen at 48 in Figure 5. Said cross bars 40 are similarly secured by additional welds 48 to the lower ends of the legs 39. The valve 47 is of a length equal to the length of the slot 37 and is sized to fit into and close said slot 37 when the yokes 38 are displaced upwardly by the springs 46. The ends of the valve 47 bear against the guide plates 38a and are retained thereby against displacement longitudinally of the housing 34 to insure proper seating of the valve 47 in the slot 37.

The outlet conduit 31 is provided with a gate valve 49 intermediate of its ends including a gate 50 which is mounted for vertical sliding movement. The upper end of the gate 50 is rigidly connected to a threaded rod 51 which is slidably disposed in and projects from the upper end of the housing of the gate valve 49. A bearing bracket 52 is secured to and projects rearwardly from the rear tank wall 32 and has a vertically disposed bearing 53 which is located directly above the gate valve 49 in which is journaled a sleeve 54. The sleeve 54 is supported and retained against vertical displacement relatively to the bearing 53 by a pair of thrust collars 55 which are detachably secured thereto and which bear against the upper and lower ends of the bearing 53. Sleeve 54 is provided with a threaded bore 56 which extends therethrough from end-to-end thereof in which the upper portion of the threaded rod 51 threadedly engages. The sleeve 54 is provided at its upper end with a beveled gear 57 which meshes with a beveled gear 58. The bearing bracket 52 is provided with an upright bearing 59 which engages a groove 60 of a hub 61 of the beveled gear 58 for journaling the beveled gear 58 and supporting it in meshing engagement with the beveled gear 57.

A pair of bearings 62 are secured on and rise from the top of the tank 21, one of which is disposed intermediate of the ends of said tank and the other near the rear end of the tank. A shaft section 63 extends slidably through and is journaled in the bearings 62 and carries a pair of collars 64 which are adjustably secured thereto between the bearings 62 to adjustably limit the sliding movement of the shaft section 63 longitudinally of the tank 21. Rearwardly of the rear bearing 62, the shaft section 63 is provided with an elongated rigid key 65 and the portion of the shaft section provided with the key 65 extends slidably through and is keyed to the beveled gear 58, as best seen in Figure 5. If desired, the keyed portion of the shaft section 63 may be of non-circular cross section to fit non-rotatably and slidably in the non-circular bore 66 of the beveled gear 58 and hub 61 or any other suitable connection may be formed between the shaft 63 and beveled gear 58 to permit the shaft to slide through the beveled gear but to prevent the shaft from turning relatively to the beveled gear. A shaft section 67 is connected at its rear end by a universal joint 68 to the forward end of the shaft section 63, forwardly of the forward bearing 62 and extends forwardly to beyond the forward end of the tank 21. A hand wheel 69 is secured to the forward end of the shaft section 67 and is disposed in a position to be conveniently engaged by the operator of a tractor or draft vehicle, not shown, to which the tongue 17 is coupled, for a purpose which will hereinafter become apparent. A bar 70 is fixed to and rises from the top of the tank 21 adjacent its forward end and as best seen in Figure 7, said bar 70 is provided with a keyhole shaped opening including a relatively large circular upper portion 71 and a restricted lower portion 72. A collar 73, as best seen in Figure 8, is adjustably secured to the shaft section 67 by a countersunk screw fastening 74. The collar 73 is sized to pass through the opening 71 but is larger in diameter than the width of the opening 72 so that when the shaft section 67 is in its position of Figures 7 and 8 with a portion thereof engaging the slot 72 and with the collar 73 bearing against the forward side of the bar 70, the shaft sections 63 and 67 are retained against rearward displacement by the abutment or collar 73. The slot 72 is sufficiently wide to permit the shaft section 67 to revolve therein. By swinging the forward end of the shaft 67 upwardly to its dotted line position of Figure 1 the collar 73 is aligned with the inclined opening 71 so that it may slide rearwardly therethrough for displacing the shaft sections 63 and 67 rearwardly of the tank 21 and said collar may similarly be displaced forwardly through the opening 71 when said shaft sections are displaced forwardly. The shaft section 67 rocks on the universal joint 68 relatively to the shaft section 63.

A rigid arm 75 is fixed to and extends upwardly from the downturned end 33 of the conduit 31. An L-shaped lever 76 is pivotally connected at its apex by a pivot pin 77 to the arm 75 above the level of the yokes 38 and includes a shorter leg 78 which extends forwardly from the pivot 77 over the intermediate portion of the connecting bar 42. A small wheel 79 is journaled on the terminal of the lever arm 78 and is disposed above and rides on a horizontal plate 80 which is secured to the upper edge of the intermediate portion of the connecting bar 42. The longer arm 81 of the lever 76 extends upwardly from the pivot 77 and terminates adjacent the level of the shaft section 63. One end of a chain or other flexible member 82 is connected to the upper portion of the lever arm 81 and said chain is adjustably connected at its other end to the rear end of the shaft section 63 in any suitable manner as by a hook 83 having a shank which is swivelly connected to a coupling element 84 which is preferably threadedly connected to the rear end of the shaft section 63, as best seen in Figure 5.

The upper portion of the tank 21 is provided with a manhole 85 normally closed by a cover 86.

The hose coupling 27 is attached to the pump inlet 25 and the opposite end of the hose 26, not shown, is submerged in a drainage vat, not shown, into which liquid manure is drained from a barn or stable by cleaning the barn or stable with a pressure water hose. The pump 24 is operated for drawing the liquid manure from the underground drainage vat through the hose 26 and pump 24 and outlet conduit 28 into the tank 21 for filling or substantially filling said tank. The coupling 27 is then disconnected from the pump 24 and the machine 10 is ready to be drawn through a field to be fertilized by a tractor or other draft vehicle, not shown, coupled to said machine by its draft tongue 17. Under certain circumstances the tank 21 may be filled from an underground vat by a gravity feed where the machine can be placed below the level of the vat and under such circumstances the pump 24 may be dispensed with. Assuming that the abutment 73 is disposed forwardly of the bar 70 and that the gate valve 50 is in a closed position, the machine 10 may be transported with the tank 21 filled without any of the liquid manure being dispensed therefrom until the area to be fertilized is reached. During such movement the valve 47 will also be held in a closed position by the springs 46 displacing the yokes or valve supporting frames 38 upwardly. To place the machine 10 in operation the hand wheel 69 is initially revolved by the draft vehicle operator from the operator's seat of the draft vehicle to thereby turn the shaft sections 63 and 67 to revolve the gears 58 and 57 for rotating the sleeve 54 in a direction to draw the rod 51 upwardly therethrough to thereby open the gate valve 50 so that the liquid manure, not shown, will flow through the outlet conduit 31 for filling the valve housing 34. The operator then swings the shaft section 67 upwardly and pulls it forwardly to move the collar 73 through the opening 71 and thereafter displaces the shaft section 67 downwardly to latch the shaft sections 63 and 67 in forwardly displaced positions. This forward movement of the shaft sections results in a forward pull being exerted on the lever arm 81 through the chain 82 to rock the lever 76 clockwise on its pivot 77 as seen in Figure 5. When this occurs, the cam wheel or roller 79 rides on the plate or surface 80 as the lever arm 78 swings downwardly for displacing the connecting bar 42 and yokes 38 downwardly to thereby move the valve 47 downwardly out of engagement with the outlet slot 37 to its open position of Figure 5, so that the liquid manure can be dispensed through said slot 37 and deflected forwardly and rearwardly by the upper portion of the valve 47 to broadcast the liquid manure onto the earth. The gate valve 50 is normally maintained in a fully opened position so that the valve housing 34 is maintained filled with the liquid manure. The pressure of the contents of the housing 34, conduit 31 and tank 21 will produce a forced feed of the liquid manure through the slot 37 to effectively flush through any particles of the liquid manure or any trash or foreign matter carried thereby which would tend to clog a part of the slot 37. Furthermore, should any clogging occur which is rendered unlikely due to the length and width of said slot, the shaft sections 63 and 67 can be displaced rearwardly as previously described to allow the springs 46 to forcibly return the valve 47 to a closed position in the slot 37 to dislodge any particles therein back into the housing 34. The extent of opening of the valve 47 may be varied by a longitudinal adjustment of the collar 73 on the shaft section 67. The gate valve 50 is maintained open at all times except when traveling to and from an area to be fertilized.

It will thus be seen that a machine of extremely simple construction has been provided wherein only a single long and relatively large discharge opening is provided through which liquid fertilizer is dispensed so that choking of the outlet is rendered substantially impossible. Further, should any clogging of the outlet slot 37 occur this condition can be promptly eliminated by the operator grasping the hand wheel 69 to swing the shaft section 67 to its dotted line position of Figure 1. With the shaft section 67 thus disposed, the shaft sections 63 and 67 may be reciprocated longitudinally by the operator from the tractor seat for moving the valve 47 between a fully closed position in engagement with the slot 37 and a fully opened position, considerably below its normal open position as illustrated in Figure 5 by moving the shafts 63 and 67 in both directions considerably beyond their positions of Figures 1 and 2. When the valve 47 is in a fully opened position, well below its position of Figure 5, the slot 37 will be fully exposed to allow any obstruction to be flushed outwardly therefrom and when the valve 47 is moved to a fully closed position any obstruction lodged in the slot 37 will be displaced back into the valve housing 34 and ordinarily broken up or agitated so that when the valve 47 again assumes an open position such particles can pass through the valve opening 37 without becoming lodged therein. This momentary closing of the valve 47 will also build up a back pressure in the housing 34 and outlet 31 which will additionally assist in clearing the opening 37 of any obstruction. It will thus be seen that the valve 47 additionally functions to produce an agitating process. After the obstruction has been cleared and with the valve 47 in an open position and the shaft section 67 swung downwardly to its full line position of Figure 1, the hand wheel 69 is released to allow the springs 46 to return the parts to their positions of Figure 1 with the valve 47 in its adjusted open position as governed by the abuttment member 73.

Various modifications and changes are contemplated and may obviously be restored to, without departing from the spirit or scope of the invention as hereinafter defined by the appended claims.

I claim as my invention:

1. A liquid manure spreader for unprocessed liquid manure comprising a large tank, a mobile support for said tank, an inlet conduit for supplying liquid manure to the tank having a discharge end opening into the upper portion of the tank, an outlet conduit extending from said tank adjacent its bottom, a valve housing into which said outlet conduit discharges, said valve housing being disposed transversely of the longitudinal axis of said mobile support, said valve housing and outlet conduit being relatively large in cross section internally, said valve housing being disposed below said outlet conduit and having a single relatively wide slot in its bottom portion extending to adjacent the ends thereof, an elongated valve disposed below the valve housing sized and shaped to fit into and completely close said slot when in an elevated position, a frame reciprocally mounted on the valve housing for vertical reciprocating movement having a lower portion secured to and supporting valve, means for displacing the frame upwardly to position the valve in a closed position in the slot, and manually actuated means adapted to be operated from an end of the machine disposed remote to the valve housing for displacing the frame downwardly to move the valve to an open position beneath and out of engagement with said slot.

2. A machine as in claim 1, said valve being circular in cross section and sized to fit into the slot when in a closed position for clearing any foreign matter therefrom and forming a deflector, when in an open position, for deflecting and spreading the liquid manure discharged from the slot.

3. A machine as in claim 1, said valve housing having open ends affording access to the interior thereof and closures detachably engaging and sealing said open ends of the valve housing.

4. A machine as in claim 1, and guide members fixed to and depending from the valve housing beyond and adjacent the ends of said slot and engaging the ends of said valve for guiding the valve in its movement to and from a closed position.

5. A machine as in claim 1, and a pump mounted on the mobile support and connected to the inlet of the tank and adapted to be detachably connected to a supply conduit for liquid manure for pumping the liquid manure into the tank.

6. A machine as in claim 1, said means for urging the frame upwardly to position the valve in a closed position comprising expansion springs interposed between the upper portion of the frame and the upper part of the valve housing, and guide rods fixed to and rising from the valve housing and extending reciprocally through the upper portion of the frame for guiding the frame in its vertical sliding movement relatively to said valve housing, said expansion springs being mounted on said rods.

7. A machine as in claim 1, said manually actuated means for displacing the frame and valve downwardly comprising a pivotally mounted lever having angularly disposed ends, one end of said lever being disposed over a portion of the frame, a roller journaled on said lever end and bearing on said frame portion, a shaft extending longitudinally of and slidably supported on the tank, means adjustably connecting one end of said shaft to the other, upstanding end of the lever and the other end of said shaft being adapted to be manually engaged and moved longitudinally of the tank in one direction to rock the lever to swing the first mentioned end downwardly for displacing said frame downwardly relatively to the valve housing.

8. A machine as in claim 1, said manually actuated means for displacing the frame and valve downwardly comprising a pivotally mounted lever having angularly disposed ends, one end of said lever being disposed over a portion of the frame, a roller journaled on said lever end and bearing on said frame portion, a shaft extending longitudinally of and slidably supported on the tank, means adjustably connecting one end of said shaft to the other, upstanding end of the lever and the other end of said shaft being adapted to be manually engaged and moved longitudinally of the tank in one direction to rock the lever to swing the first mentioned end downwardly for displacing said frame downwardly relatively to the valve housing, and means for adjustably latching said shaft in a position to retain the valve in various open positions relatively to said outlet slot.

9. A machine as in claim 1, said manually actuated means for displacing the frame and valve downwardly comprising a pivotally mounted lever having angularly disposed ends, one end of said lever being disposed over a portion of the frame, a roller journaled on said lever end and bearing on said frame portion, a shaft extending longitudinally of and slidably supported on the tank, means adjustably connecting one end of said shaft to the other, upstanding end of the lever and the other end of said shaft being adapted to be manually engaged and moved longitudinally of the tank in one direction to rock the lever to swing the first mentioned end downwardly for displacing said frame downwardly relatively to the valve housing, a gate valve interposed in said outlet conduit, a pair of beveled gears, bearing means supporting said beveled gears in meshing engagement, means forming a threaded connection between the gate valve and one beveled gear for moving said gate valve to and from open and closed positions when said beveled gear is revolved, and means slidably and non-rotatably connecting the other beveled gear to a portion of said shaft whereby the gate valve may be actuated by rotation of said shaft and said first mentioned valve opened by a sliding movement of the shaft, each independently of the other.

JAMES H. BRODIE.

REFERENCES CITED

The following references are of record in the file of this patent:

UNITED STATES PATENTS

| Number | Name | Date |
| --- | --- | --- |
| 724,692 | Glover | Apr. 7, 1903 |
| 849,081 | Ortmann | Apr. 2, 1907 |
| 1,055,602 | Blevins | Mar. 11, 1913 |